(12) United States Patent
Eichelberger et al.

(10) Patent No.: US 9,855,611 B2
(45) Date of Patent: Jan. 2, 2018

(54) TOOLHOLDER WITH VISCOUS FLUID INERTIAL MASS DAMPER

(71) Applicant: Kennametal Inc., Latrobe, PA (US)

(72) Inventors: Samuel Lawrence Eichelberger, Trafford, PA (US); Shi Chen, North Huntingdon, PA (US); Ruy Frota de Souza Filho, Latrobe, PA (US); Jason Won Goldsmith, Greensburg, PA (US); Igor Kaufmann, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 133 days.

(21) Appl. No.: 14/840,198

(22) Filed: Aug. 31, 2015

(65) Prior Publication Data
US 2017/0056977 A1    Mar. 2, 2017

(51) Int. Cl.
*B23B 29/02*    (2006.01)
*F16F 7/10*     (2006.01)
*B23B 27/00*    (2006.01)
*F16F 7/104*    (2006.01)

(52) U.S. Cl.
CPC .......... *B23B 29/022* (2013.01); *B23B 27/002* (2013.01); *B23B 27/007* (2013.01); *F16F 7/104* (2013.01); *F16F 7/1034* (2013.01); *B23B 2260/004* (2013.01)

(58) Field of Classification Search
CPC .............. B23B 29/022; B23B 2250/16; B23B 2260/004; B23B 2260/068; B23B 2260/146
See application file for complete search history.

(56) References Cited

U.S. PATENT DOCUMENTS

| | | | |
|---|---|---|---|
| 4,061,438 A | 12/1977 | New | |
| 2015/0375304 A1* | 12/2015 | Frota de Souza Filho | B23B 29/022 408/143 |

FOREIGN PATENT DOCUMENTS

| | | |
|---|---|---|
| CN | 101758253 A | 6/2010 |
| GB | 744041 A | 2/1956 |
| GB | 1 320 531 A | 6/1973 |

* cited by examiner

*Primary Examiner* — Alan Snyder
(74) *Attorney, Agent, or Firm* — Ian K. Samways

(57) ABSTRACT

A toolholder includes a cutting tool mounted to a head attached to a collar at a first end of the toolholder. A shank is located at a second, opposite end of the toolholder. A central cavity extends inwardly from the first end toward the shank. A viscous fluid inertia mass damper is disposed within the central cavity. The viscous fluid inertia mass damper includes an absorber body having a first end, a second end opposite the first end, a fluid reservoir formed in the damper body for containing a viscous fluid, and a plurality of apertures formed in the damper body for allowing the viscous fluid to flow from the fluid reservoir and through the apertures to suppress vibration of the toolholder. A method for suppressing vibrations in a toolholder is also disclosed.

9 Claims, 4 Drawing Sheets

TOOLHOLDER WITH VISCOUS FLUID INERTIAL MASS DAMPER

FIELD OF THE INVENTION

In general, the invention relates to a toolholder and, more particularly, to a toolholder, such as a boring bar, with a tunable viscous fluid inertia mass damper for passive vibration suppression.

BACKGROUND OF THE INVENTION

During a metal cutting operation, any vibratory motion between a toolholder and workpiece may lead to undesirable cutting performances such as poor workpiece surface finish and out-of-tolerance finished workpieces. Furthermore, such vibration may cause the toolholder or the machine tool to become damaged.

To reduce these vibrations, the metal removal rate can be decreased. However, this approach interferes with production and only minimally reduces the amount of vibration.

Attempts to eliminate the vibration in a toolholder may also include using a boring bar fabricated from solid carbide. Solid carbide, because of its inherently high density, reduces the amount of chatter and vibration transferred to the boring bar. However, solid carbide is extremely expensive. Furthermore, although chatter and vibration are reduced by the inherently high density of the solid carbide bar, vibration nonetheless may build to an unacceptable level. Still furthermore, solid carbide is fairly brittle and a minor impact upon the boring bar during use or setup may inadvertently damage the bar.

A further attempt to reduce vibration in boring bars includes mounting upon or within the bar a dynamic vibration absorber, such as that absorber disclosed in U.S. Pat. No. 3,774,730, which is comprised of a cylindrical mass of a high density material supported on rubber bushings. When optimally tuned, the mass oscillates in response to vibration produced in the boring bar to cancel out vibration. The absorber may be tuned to accommodate the boring bar for the speed at which the workpiece or boring bar is rotating, the length of the boring bar and the type of cutting tool connected at the end of the bar. Such an adjustment is made by longitudinally urging pressure plates at opposing ends of the cylindrical mass thereby compressing the rubber bushings against the mass which simultaneously shifts the position of the mass and alters the stiffness of the rubber bushings to change the dynamics of the cylindrical mass.

However, even with such a design available, each time the boring bar is to be used under different conditions, it must be tuned using sophisticated equipment that may or may not be available on the shop floor.

SUMMARY OF THE INVENTION

The problem of suppressing vibration in a toolholder is solved by providing a viscous fluid inertia mass damper disposed within a central cavity of the toolholder with a damper body having a fluid reservoir formed in an absorber mass for containing a viscous fluid, and a plurality of apertures formed in the damper body for allowing the viscous fluid to flow through the apertures to provide damping and suppress vibration of the toolholder.

In one aspect of the invention, a toolholder comprises a cutting tool mounted to a head attached to a collar at a first end of the toolholder. A shank is located at a second, opposite end of the toolholder. A central cavity extends inwardly from the first end toward the shank. A viscous fluid inertia mass damper is disposed within the central cavity. The viscous fluid inertia mass damper comprises a damper body having a first end, a second end opposite the first end, a fluid reservoir formed in the damper body for containing a viscous fluid, and a plurality of apertures formed in the damper body for allowing the viscous fluid to flow from the fluid reservoir and through the apertures to provide damping, thereby suppressing vibrations of the toolholder.

In another aspect, a method of suppressing vibrations in a toolholder, the toolholder comprising a viscous fluid inertia mass damper disposed within a central cavity, the viscous fluid inertia mass damper comprising a damper body having a fluid reservoir formed in the damper body for containing a viscous fluid, and a plurality of apertures formed in the damper body, the method comprising allowing the viscous fluid to flow from the fluid reservoir and through the apertures to provide damping, thereby suppressing vibrations of the toolholder.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
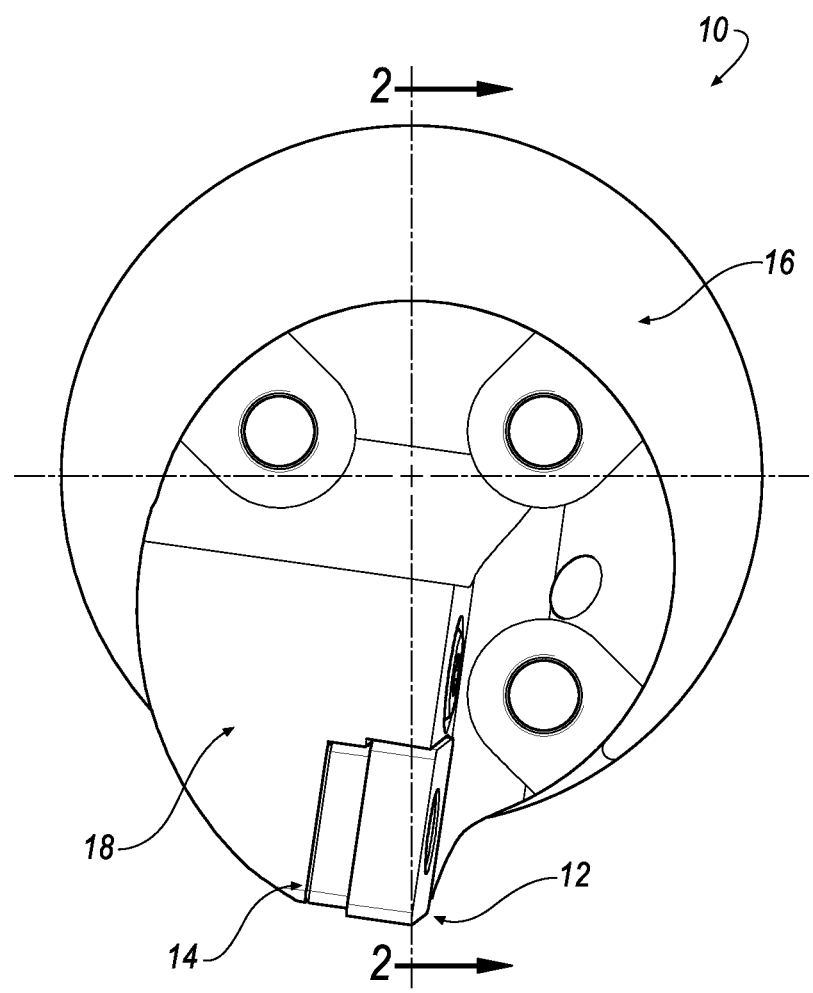
FIG. 1 is an end view of a toolholder with a viscous fluid inertia mass damper according to an embodiment of the invention.
Figure 2:
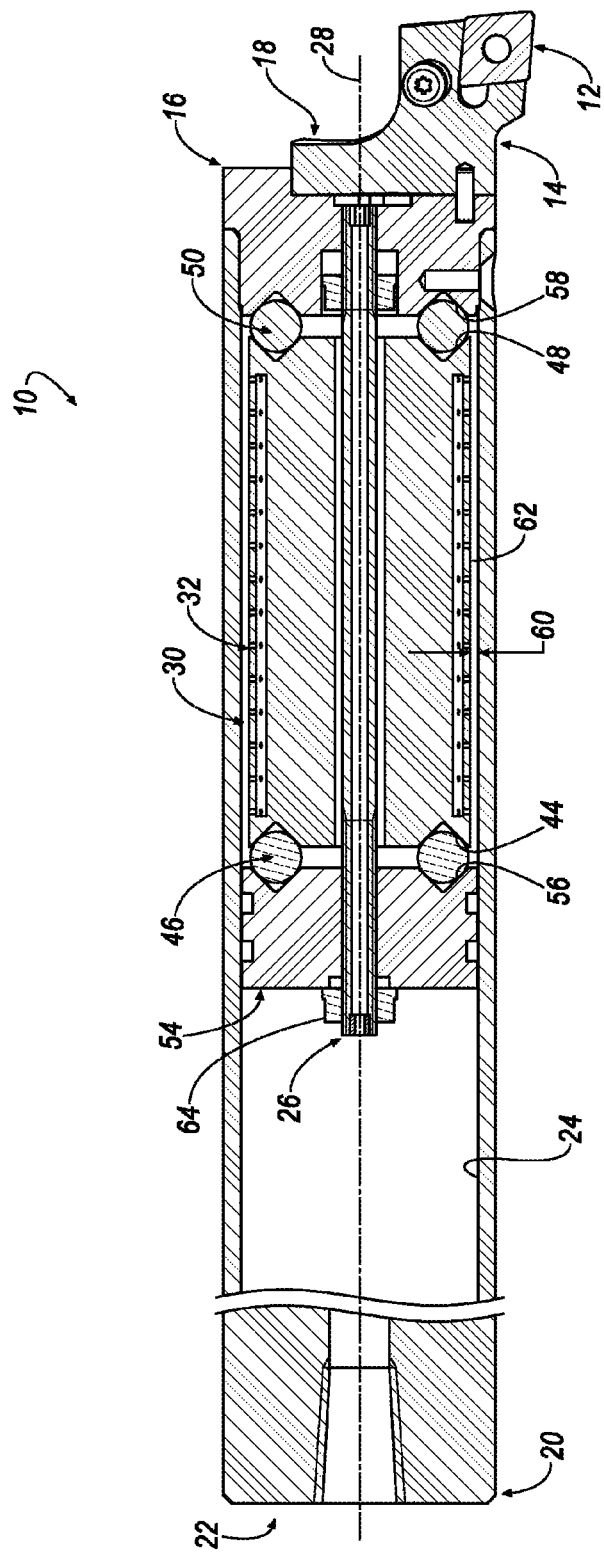
FIG. 2 is a cross-sectional view of the toolholder with the viscous fluid inertia mass damper taken along line 2-2 of FIG. 1.
Figure 4:
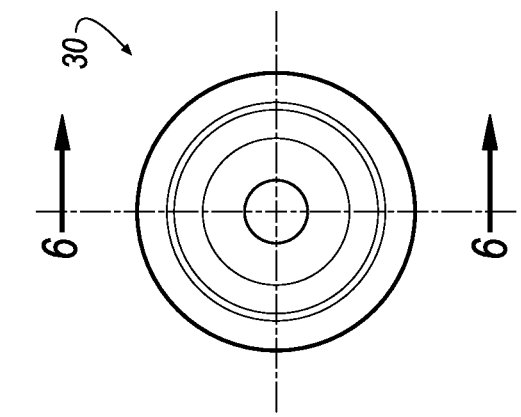
FIG. 4 is an end view of the viscous fluid inertia mass damper according to an embodiment of the invention.
Figure 3:
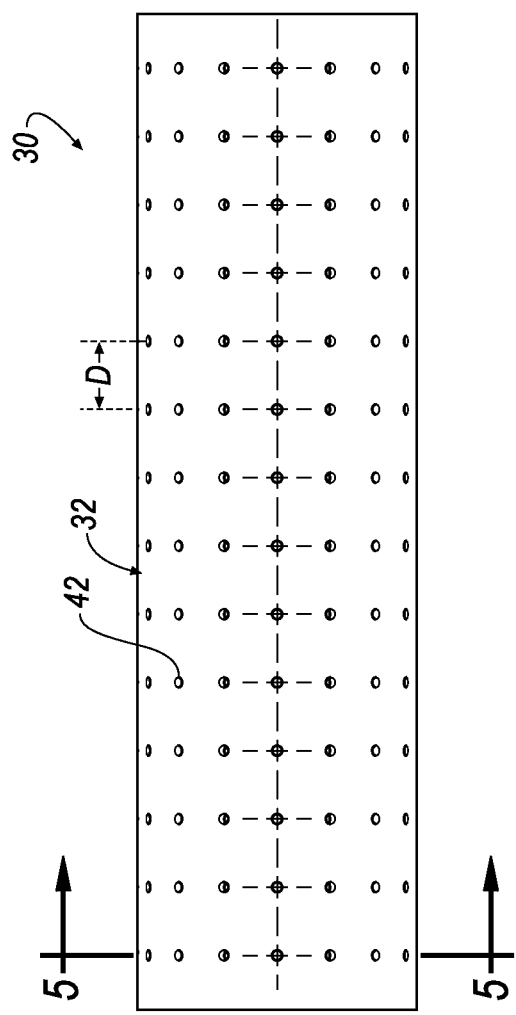
FIG. 3 is a side view of the viscous fluid inertia mass damper according to an embodiment of the invention.
Figures 5, 6:
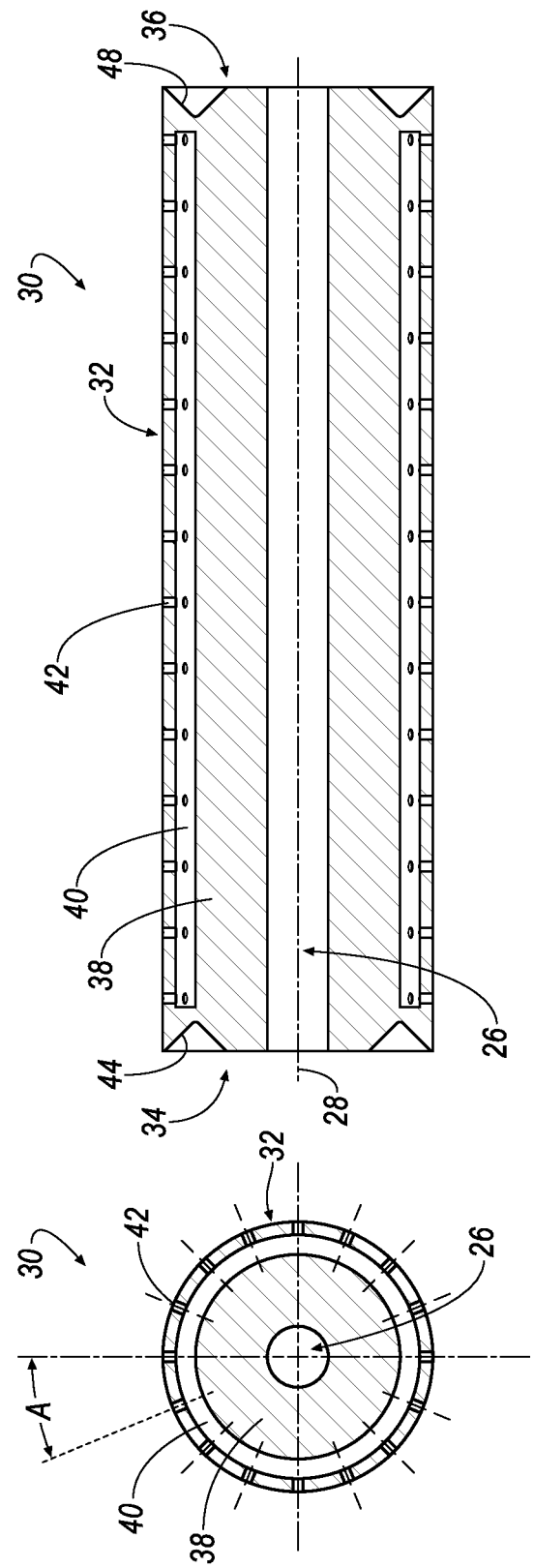
FIG. 5 is a cross-sectional view of the viscous fluid inertia mass damper taken along line 5-5 of FIG. 3.
FIG. 6 is a cross-sectional view of the viscous fluid inertia mass damper taken along line 6-6 of FIG. 4.

Referring now to FIGS. 1 and 2, a toolholder 10, such as a boring bar is shown according to an embodiment of the invention. Although the present invention is directed to a boring bar 10 for boring deep holes in work pieces, the principles of the invention can be applied to any toolholder that produces vibrations when cutting a work piece.

A cutting tool 12, such as a cutting insert, may be mounted in a conventional manner to a head 14 attached to a collar 16 at one end 18 of the boring bar 10. A shank 20 is located at the opposite end 22 of the boring bar 10. The boring bar 10 has a central cavity 24 extending inwardly from the end 18 toward the shank 20. In the illustrated embodiment, the boring bar 10 includes a coolant tube assembly 26 extending along a central, longitudinal axis 28 of the boring bar 10 for providing coolant in the vicinity of the cutting insert 12. It will be appreciated that the coolant tube assembly 26 is optional and can be omitted. For example, the coolant tube can be replaced with a threaded stud or a solid stud with threaded ends.

Use of the boring bar 10 in a metalworking operation will produce vibrations that travel through the boring bar 10, thereby affecting the stability of the cutting process. For this reason, the boring bar 10 is provided with a viscous fluid inertia mass damper, shown generally at 30, according to an embodiment of the invention that will dampen the vibrations traveling through the boring bar 10.

Referring now to FIGS. 3-6, the viscous fluid inertia mass damper 30 comprises a generally cylindrical damper body 32 having a first end 34 and a second end 36 opposite the first end 34. In the illustrated embodiment, the entire damper body 32 is solid and constitutes an absorber mass with a length of about 5.80 inches (147.32 mm). The damper body 32 has a central region 38 disposed about the optional coolant tube assembly 26. Alternatively, the coolant tube assembly 26 can be omitted, in which case the central region 38 would be solid. The damper body 32 can be made of any suitably dense material of a type known in the art, such as tool steel, carbide, and the like.

One aspect of the invention is that the viscous fluid inertia mass damper 30 has an annular fluid reservoir 40 formed in the damper body 32 for containing a viscous fluid according to an embodiment of the invention. The fluid reservoir 40 may contain any fluid that has a viscosity that is greater than liquid water.

As used herein, viscosity is the ability of substances, especially fluids, to resist flow. It can also be referred to as the measure of the ability of a liquid to resist being deformed by extensional stress. It is commonly perceived as "thickness", or resistance to flow. Viscosity describes a fluid's internal resistance to flow and may be thought of as a measure of fluid friction. Thus, water is "thin", having a lower viscosity, while olive oil is "thick" having a higher viscosity. All real fluids (except superfluids) have some resistance to stress, but a fluid which has no resistance to shear stress is known as an ideal fluid or inviscid fluid. Some examples of highly viscous liquids are oils, honey, glycerin, tar and sulfuric acid.

Viscosity of liquid water at different temperatures up to the normal boiling point is listed in TABLE I below.

TABLE I

Viscosity of liquid water

| Temperature [° C.] | Viscosity [mPa · s] |
| --- | --- |
| 10 | 1.308 |
| 20 | 1.002 |
| 30 | 0.7978 |
| 40 | 0.6531 |
| 50 | 0.5471 |
| 60 | 0.4658 |
| 70 | 0.4044 |
| 80 | 0.3550 |
| 90 | 0.3150 |
| 100 | 0.2822 |

Some examples of the viscosity of liquids is listed in TABLE II below.

TABLE II

Viscosity of liquids (at 25° C., unless otherwise specified)

| Liquid | Viscosity [Pa · s] | Viscosity [cP = mPa · s] |
| --- | --- | --- |
| acetone | $3.06 \times 10^{-4}$ | 0.306 |
| benzene | $6.04 \times 10^{-4}$ | 0.604 |
| castor oil | 0.985 | 985 |
| corn syrup | 1.3806 | 1,380.6 |
| ethanol | $1.074 \times 10^{-3}$ | 1.074 |
| ethylene glycol | $1.61 \times 10^{-2}$ | 16.1 |
| glycerol (at 20° C.) | 1.2 | 1,200 |
| HFO-380 | 2.022 | 2,022 |
| mercury | $1.526 \times 10^{-3}$ | 1.526 |
| methanol | $5.44 \times 10^{-4}$ | 0.544 |
| motor oil SAE 10 (20° C.) | 0.065 | 65 |
| motor oil SAE 40 (20° C.) | 0.319 | 319 |
| nitrobenzene | $1.863 \times 10^{-3}$ | 1.863 |
| liquid nitrogen @ 77 K | $1.58 \times 10^{-4}$ | 0.158 |
| propanal | $1.945 \times 10^{-3}$ | 1.945 |
| olive oil | 0.081 | 81 |
| pitch | $2.3 \times 10^{8}$ | $2.3 \times 10^{11}$ |
| sulfuric acid | $2.42 \times 10^{-2}$ | 24.2 |
| water | $8.94 \times 10^{-4}$ | 0.894 |

As mentioned above, the fluid that can be used in the viscous fluid inertial mass damper 30 of the invention has a viscosity greater than liquid water of about 0.894 at 25° C. For example, the fluid may be motor oil SAE 10, which has a viscosity of about 65. In another example, the fluid may be olive oil, which has a viscosity of about 81. It should be appreciated that the invention can be practiced with any suitable fluid, so long as the viscosity is greater than liquid water.

The viscous fluid inertia mass damper 30 also includes a plurality of linear and circumferentially spaced apertures 42 formed in the damper body 32. Each aperture 42 extends radially from the fluid reservoir 40 to the exterior of the damper body 32. In the illustrated embodiment, the damper body 32 may have sixteen (16) circumferential apertures 42 equally spaced at an angle, A, of about 22.5 degrees from each other. In addition, the damper body 32 may have about fourteen (14) linear apertures 42 equally spaced at a distance, D, of about 0.40 inches (10.10 mm) from each other. Thus, in the illustrated embodiment, the damper body 32 has a total of about (16×14=224) apertures 42 formed therein. However, it will be appreciated that the invention is not limited by the number of apertures formed in the damper body 32, and that the invention can be practiced with any desirable number of apertures 42 to provide adequate vibration damping of the toolholder 10.

In the illustrated embodiment, each aperture 42 is circular having a diameter of about 0.06 inches (1.50 mm). However, it will be appreciated that the invention is not limited by the shape of the apertures 42 formed in the damper body 32, and that the invention can be practiced with any desirable shape, such as square, rectangular, polygonal, and the like, to provide adequate vibration damping of the toolholder 10.

The first end 34 of the damper body 32 includes a circumferential V-shaped notch 44 for supporting a first elastomeric support 46, such as an O-ring, and the like (FIG. 2). Similar to the first end 34, the second end 36 of the damper body 32 has a circumferential V-shaped notch 48 for accommodating a second elastomeric support 50 (FIG. 2), such as an O-ring, and the like.

Referring back to FIG. 2, the viscous fluid inertia mass damper 30 is tunable by means of an adjusting wedge 54 positioned proximate the first end 34 of the absorber body 32. Similar to the damper body 32, the adjusting wedge 54 has a circumferential V-shaped notch 56 for accommodating the first elastomeric support 46. Similarly, the collar 16 has a circumferential V-shaped notch 58 for accommodating the second elastomeric support 50 proximate the second end 36 of the damper body 32. As a result, the first and second elastomeric supports 46, 50 cause the viscous fluid inertia mass damper 30 to be suspended within the central cavity 24 of the toolholder 10 by a small distance 60 when the viscous fluid inertia mass damper 30 is mounted within the central cavity 24 of the toolholder 10. Thus, a small cavity 62 exists between the viscous fluid inertia mass damper 30 and the central cavity 24 when the viscous fluid inertia mass damper 30 is mounted with the central cavity 24 of the toolholder 10.

The adjusting wedge 54 is movable within the central cavity 24 in an axial direction along the central, longitudinal axis 28 of the toolholder 10, thereby selectively adjusting an amount of pressure exerted against the first and second elastomeric supports 46, 50 to tune the viscous fluid inertia mass damper 30 to a desired frequency. The adjusting wedge 54 is threaded onto coolant tube assembly 26. To tune the subject boring bar 10 it has, in the past, been necessary to monitor the vibration of the boring bar 10 and tighten or loosen the adjusting wedge 54, thereby adjusting the pressure of the elastomer supports 46, 50 against the viscous fluid inertia mass damper 30. However, this approach becomes cumbersome, and in the boring bar 10 of the invention, it is possible to predefine the amount of compression necessary on the elastomer supports 46, 50 against the viscous fluid inertia mass damper 30 to minimize vibration (i.e. maximize vibration suppression) under different tool conditions. In this manner, a machine operator may simply adjust the compression of the elastomer supports 46, 50 to predetermine levels for tuning by selectively adjusting the amount of pressure exerted by the adjusting wedge 54 against the elastomeric supports 46, 50, and then threading a jam nut 64 to prevent axial movement of the adjusting wedge 54 along the central, longitudinal axis 28.

During operation, when the damper body 32 vibrates, the viscous fluid contained in the fluid reservoir 40 enters and exits through the apertures 42 formed in the damper body 32 and into the small cavity 62, thereby providing fluid damping of vibrations due to the shear action of the viscous fluid.

As described above, the toolholder 10, such as a boring bar, includes a viscous fluid inertia mass damper 30 using viscous fluid for vibration suppression. The viscous fluid inertia mass damper 30 is tunable by selectively positioning the adjusting wedge 54 along the central, longitudinal axis 28 of the toolholder 10 such that a desired force is exerted against the elastomeric supports 46, 50. The method of fluid damping for suppression of vibrations generated by the toolholder provides for superior damping capability as compared to conventional damping methods using a solid absorber mass.

The patents and publications referred to herein are hereby incorporated by reference.

Having described presently preferred embodiments the invention may be otherwise embodied within the scope of the appended claims.

What is claimed is:

1. A toolholder, comprising:
a cutting tool mounted to a head attached to a collar at a first end of the toolholder;
a shank located at a second, opposite end of the toolholder;
a central cavity extending inwardly from the first end toward the shank; and
a viscous fluid inertia mass damper disposed within the central cavity, the viscous fluid inertia mass damper comprising a damper body having a first end, a second end opposite the first end, a fluid reservoir formed in the damper body for containing a viscous fluid, and a plurality of apertures formed in the damper body for allowing the viscous fluid to flow from the fluid reservoir and through the apertures to provide damping, thereby suppressing vibrations of the toolholder.

2. The toolholder of claim 1, wherein the plurality of apertures are equally and circumferentially spaced from each other.

3. The toolholder of claim 1, wherein the plurality of apertures are equally and linearly spaced from each other.

4. The toolholder of claim 1, wherein the first end of the damper body has a circumferential V-shaped notch for accommodating a first elastomeric support, and wherein the second end of the damper body has a circumferential V-shaped notch for accommodating a second elastomeric support.

5. The toolholder of claim 4, further comprising an adjusting wedge movable within the central cavity in an axial direction along a central, longitudinal axis of the toolholder to selectively adjust an amount of pressure exerted against the first and second elastomeric supports to tune the viscous fluid inertia mass damper to a desired frequency.

6. The toolholder of claim 5, further comprising a jam nut to prevent axial movement of the adjusting wedge along the central, longitudinal axis.

7. The toolholder of claim 1, wherein the toolholder comprises a boring bar.

8. The toolholder of claim 1, further comprising a cavity between the viscous fluid inertia mass damper and the central cavity of the toolholder, wherein the viscous fluid flows between the fluid reservoir and the cavity through the apertures to suppress vibrations of the toolholder.

9. A method of suppressing vibrations in a toolholder, the toolholder comprising a viscous fluid inertia mass damper disposed within a central cavity, the viscous fluid inertia mass damper comprising a damper body having a fluid reservoir formed in the damper body for containing a viscous fluid, and a plurality of apertures formed in the damper body, the method comprising:
contacting a workpiece with the toolholder; and
allowing the viscous fluid to flow from the fluid reservoir and through the apertures to provide damping, thereby suppressing vibrations of the toolholder.

* * * * *